(12) United States Patent
Noebel (10) Patent No.: US 11,753,831 B2
(45) Date of Patent: Sep. 12, 2023

(54) FLOOR PANEL FOR AN AIRCRAFT OR SPACECRAFT, AIRCRAFT OR SPACECRAFT, AND METHOD FOR PRODUCING A FLOOR PANEL

(71) Applicant: Airbus Operations GmbH, Hamburg (DE)

(72) Inventor: Torsten Noebel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 225 days.

(21) Appl. No.: 17/198,788

(22) Filed: Mar. 11, 2021

(65) Prior Publication Data

US 2021/0285238 A1 Sep. 16, 2021

(30) Foreign Application Priority Data

Mar. 13, 2020 (DE) .......................... 102020203231.9

(51) Int. Cl.
*E04F 15/10* (2006.01)
*B29C 45/00* (2006.01)
(Continued)

(52) U.S. Cl.
CPC ........ *E04F 15/102* (2013.01); *B29C 45/0005* (2013.01); *B64C 1/18* (2013.01); *B29L 2031/3082* (2013.01)

(58) Field of Classification Search
CPC ....... B64C 1/18; B29C 45/0005; E04F 15/102
See application file for complete search history.

(56) References Cited

U.S. PATENT DOCUMENTS

| 5,108,839 A | * | 4/1992 | Lucke | ...................... C08K 7/06 528/193 |
| 6,427,945 B1 | * | 8/2002 | Bansemir | ................ B64C 1/062 244/119 |

(Continued)

FOREIGN PATENT DOCUMENTS

| DE | 10237803 B4 | 3/2004 |
| DE | 102010050740 A1 | 5/2012 |

(Continued)

OTHER PUBLICATIONS

German Search Report; priority document.

*Primary Examiner* — Michael H Wang
(74) *Attorney, Agent, or Firm* — Greer, Burns & Crain, Ltd.

(57) ABSTRACT

A floor panel for an aircraft or spacecraft. The floor panel has a panel-like portion and an additional structure. A first side of the panel-like portion forms part of a floor surface in the aircraft or spacecraft. The additional structure is connected to the panel-like portion on a second side of the panel-like portion that is opposite the first side. The panel-like portion and the additional structure each comprise a matrix material formed by a thermoplastic material. Endless reinforcing fibers are embedded in the matrix material of the panel-like portion. Discontinuous reinforcing fibers are embedded in the matrix material of the additional structure. An aircraft or spacecraft may have a floor area which is formed by a planar arrangement of floor panels of this type. The method for producing a floor panel for an aircraft or spacecraft is provided.

13 Claims, 6 Drawing Sheets

(51) Int. Cl.
*B64C 1/18* (2006.01)
*B29L 31/30* (2006.01)

(56) References Cited

U.S. PATENT DOCUMENTS

| | | | | |
|---|---|---|---|---|
| 2006/0138279 | A1* | 6/2006 | Pisarski | B64C 1/18 |
| | | | | 244/118.5 |
| 2008/0210820 | A1* | 9/2008 | Kismarton | B64C 1/18 |
| | | | | 244/119 |
| 2010/0065686 | A1* | 3/2010 | Tauscher | B64C 1/18 |
| | | | | 244/129.1 |
| 2010/0243803 | A1* | 9/2010 | Westre | B64C 1/18 |
| | | | | 244/119 |
| 2014/0044914 | A1* | 2/2014 | Kurtz | B32B 3/28 |
| | | | | 428/74 |
| 2014/0131917 | A1* | 5/2014 | Naumann | B32B 37/10 |
| | | | | 425/500 |
| 2016/0121993 | A1* | 5/2016 | Nehring | B32B 5/245 |
| | | | | 244/118.5 |
| 2017/0144765 | A1* | 5/2017 | Simpson | B60N 2/015 |
| 2017/0355110 | A1* | 12/2017 | Schwing | B29C 66/532 |
| 2019/0077495 | A1* | 3/2019 | Lange | B32B 3/30 |
| 2019/0118929 | A1* | 4/2019 | Owens | B32B 27/12 |
| 2019/0144099 | A1* | 5/2019 | Roth | B64C 1/061 |
| | | | | 244/119 |

FOREIGN PATENT DOCUMENTS

| | | | |
|---|---|---|---|
| DE | 102016210123 | A1 | 12/2017 |
| EP | 0383220 | A1 | 8/1990 |
| EP | 2633979 | A1 | 9/2013 |

* cited by examiner

FLOOR PANEL FOR AN AIRCRAFT OR SPACECRAFT, AIRCRAFT OR SPACECRAFT, AND METHOD FOR PRODUCING A FLOOR PANEL

CROSS-REFERENCES TO RELATED APPLICATIONS

This application claims the benefit of the German patent application No. 102020203231.9 filed on Mar. 13, 2020, the entire disclosures of which are incorporated herein by way of reference.

FIELD OF THE INVENTION

The invention relates to a floor panel for an aircraft or spacecraft. The invention also relates to an aircraft or spacecraft, in particular an airplane, having a floor area which is formed by a planar arrangement of floor panels of this type. In addition, the invention relates to a method for producing a floor panel for an aircraft or spacecraft.

Although the invention can find use in the field of aircraft or spacecraft for the purpose of forming floor areas in very different parts of an aircraft or spacecraft and, in particular, a passenger aircraft, the invention and the problem it addresses are intended to be explained in more detail below on the basis of the example of a floor area in a passenger compartment of a passenger aircraft and additionally on the basis of the example of the floor area in a cargo hold of a passenger aircraft.

BACKGROUND OF THE INVENTION

Nowadays, according to a conventional design, to form the floor area of the passenger compartment and the cargo compartment floor, a multiplicity of individual floor panels are used, the planar arrangement of which forms the floor of the passenger compartment or the cargo hold floor. The floor panels are conventionally nowadays designed as sandwich panels, for example with a honeycomb core, both for the passenger area and for the cargo area.

In this respect, the honeycomb core is located between two outer or cover layers, which today are usually manufactured from a fiber-reinforced composite material comprising a heat-curing polymer matrix. Typical for the passenger area in this case are cover layers reinforced by carbon fibers, and, in the cargo or freight area, cover layers which are reinforced by glass fibers.

The conventional floor panels of the type described above have a relatively high stiffness together with relatively thin cover layers by virtue of the sandwich construction thereof.

Depending on the loading, different types of floor panels, for example those with a varying weight per unit area, can conventionally be combined to form the passenger floor. In the case of conventional solutions, different types of panels can also be used in the cargo area depending on the loading and on the type of cargo, i.e., for example when containers are being loaded or instead when individual items of general cargo are being loaded.

Although panels of the conventional type described above have a low weight, the production of the sandwich panels is relatively expensive and time-consuming. In addition, the conventional sandwich floor panels usually require not only an additional, expensive and complex filling of the cut edges of the floor panels with a filler material in order to ensure a cleaner peripheral termination, but also inserts which are provided specifically for the purpose of fastening the floor panels and allow fastening elements to be fitted in.

It would be desirable if floor panels for use in an aircraft or spacecraft could be produced with less outlay and costs together with high robustness and service life, in particular in view of the loads which are typical for the passenger area and/or the cargo area, such as, for example, impact and shock loads and in the passenger area moreover, for instance, the loading for example caused by service trolleys ("airline service trolley").

In the field of structural components for aircraft or spacecraft, DE 10 2016 210 123 A1 and US 2017/0355110 A1 have proposed to connect a first component region for stiffening another element and a second component region in a permanent manner What is described is to embed continuous reinforcing fibers into a matrix formed by a thermoplastic polymer material in the first component region, whereas the second component region is either free from reinforcing fibers or comprises discontinuous reinforcing fibers embedded in a matrix formed by a thermoplastic polymer material. In accordance with DE 10 2016 210 123 A1 and US 2017/0355110 A1, the second component region can be molded on in an injection molding process.

SUMMARY OF THE INVENTION

Against this background, an object on which the invention is based is to propose an improved floor panel for an aircraft or spacecraft which can be produced in a manner which saves time, is cost-effective and preferably can be automated to a considerable extent, and which moreover, in particular, achieves a high robustness and service life. The invention is also based on an object of specifying a correspondingly improved aircraft or spacecraft as well as a correspondingly improved method for producing a floor panel.

A floor panel for an aircraft or spacecraft which has a panel-like portion and an additional structure is accordingly provided. In this respect, a first side of the panel-like portion is provided for forming part of a floor surface in the aircraft or spacecraft. The additional structure is furthermore here connected to the panel-like portion at least on a second side of the panel-like portion that is opposite the first side. In the case of the floor panel according to the invention, the panel-like portion and the additional structure each comprises a matrix material formed by a thermoplastic material. In this respect, endless fibers in the form of reinforcing fibers are embedded in the matrix material of the panel-like portion. Discontinuous reinforcing fibers are embedded in the matrix material of the additional structure.

What is also proposed is an aircraft or spacecraft, in particular an airplane, having a floor area which is formed by a planar arrangement of floor panels of this type according to the invention.

A method for producing a floor panel for an aircraft or spacecraft, in particular for producing a floor panel of this type according to the invention, is also proposed and comprises the steps of:

providing a panel-like piece which comprises a matrix material formed by a thermoplastic material and endless fibers in the form of reinforcing fibers, wherein a first side of the panel-like piece is provided for forming part of a floor surface in the aircraft or spacecraft;

delivering the panel-like piece into a molding tool;

forming an additional structure onto the panel-like piece in the molding tool, wherein the additional structure is formed with a matrix material formed by a thermoplastic material and discontinuous reinforcing fibers are embedded into the matrix material of the additional structure, and wherein the additional structure is permanently connected to the panel-like piece on a second side of the panel-like piece that is opposite the first side during the forming-on operation.

One of the findings on which the present invention is based is that a floor panel according to the invention can be produced as a weight-saving, fiber-reinforced element in an efficient and cost-effective manner and moreover can be designed very robustly, in particular against shock and impact loads. The invention makes it possible to form the floor panel with an additional structure with considerable savings in terms of time, in that with the invention this structure can be formed on the panel-like piece which forms the panel-like portion in the finished floor panel and can be connected to the panel-like piece to afford a unified component. The additional structure can here, for example, advantageously be provided with a relatively complex geometry in certain regions, as a result of which the additional structure can be provided in the floor panel for different functions, for example for stiffening, reinforcing, covering and/or protective functions.

The invention also makes it possible to configure the floor panel with improved flexibility, as a result of which the floor panel yields flexibly in an improved manner when being struck by an object, such as, for example, an item of luggage, for instance a suitcase or the like. A flexibility of this kind of the floor panel as a whole, in particular by means of the provision of a panel-like portion as a "monolithic" load-bearing layer, contributes to an advantageous robustness of the floor panel. In this way, damage to the floor panel under shock or impact loads ("impact") can be avoided in a further improved manner.

The reinforcement of the panel-like portion can be brought about in a simple, effective manner using endless fibers in view of its uncomplicated geometry. A panel-like portion which is able to bear high loads is thus obtained, without it being necessary to expend greater effort for a complicated arrangement of endless fibers. By contrast, a stable, resistant additional structure with fiber reinforcement and higher geometric complexity is achieved by using discontinuous fibers.

Advantageous configurations and refinements will emerge from the dependent claims and from the description with reference to the figures.

According to one refinement, the additional structure is arranged substantially or at least mostly on the rear side of the panel-like portion. In this way, the additional structure can, for example, readily assume a supporting and/or stabilizing and/or protective function, whereas the first side of the panel-like portion on the front side of the floor panel in the form of a used side can readily serve for forming the floor surface.

In one configuration, the additional structure is formed with a strut or a plurality of struts for stiffening the panel-like portion. It is thus possible to produce a floor panel which is sufficiently stiffened against deformation, in particular sagging, during use in an efficient and cost-saving manner By way of example, by selecting, in particular, the dimensions, number and spacings of the struts, influence can be brought to bear on the ability to bear loads and stiffness of the floor panel.

In one refinement, the struts comprise a plurality of rib-like or beam-like struts, each of which is connected to the panel-like portion with a longitudinal direction of the strut arranged substantially parallel to a main plane of extent of the panel-like portion. The rib-like or beam-like struts can thus contribute to supporting and stiffening the panel-like portion in a particularly effective manner as stiffening elements.

In a further refinement, the struts comprise a plurality of struts, each of which is aligned with a longitudinal direction of the strut transverse, in particular substantially perpendicular, to an edge, in particular a longitudinal edge, of the floor panel. Floor panels can, e.g., in passenger aircraft, have, for example, a rather elongate form and, in the region of the edges thereof, in particular along the longitudinal edges thereof, rest on supporting, for example rail-like, elements and/or be fastened to these elements. In cases of this type, there is thus an introduction of load into the floor panel in the region of the edges and in particular the longitudinal edges. A stiffening by virtue of the struts can thus often be particularly effective when the struts run perpendicularly to the edge, in particular the longitudinal edge, of the floor panel. The struts, which are aligned with the longitudinal direction of the strut transverse and, in particular, substantially perpendicular to the edge, in particular the longitudinal edge, can in this respect be referred to as, in particular, transversal, crosspiece-like stiffening elements or crosspieces. When force is introduced at longitudinal sides of the floor panel at which they rest, for example, on seat rails, crosspieces of this type can already suffice to stiffen the panel-like portion. In a further configuration of this type, all of the struts of the additional structure can thus run transversely, substantially perpendicularly, to the longitudinal edge of the floor panel. The struts make it possible to reduce the sagging when the floor panel is subjected to load. Shear loads in the plane of the floor panel can be readily absorbed by the panel-like portion which forms the cover layer in the floor panel. To reduce the weight of the floor panel, a configuration thereof with struts, which are all in the form of crosspieces and run transversely, in particular perpendicularly, to the edge, for instance the longitudinal edge, may be preferred.

In one configuration, the struts comprise a plurality of struts, each of which is arranged with a longitudinal direction of the strut at an angle to a longitudinal direction of the floor panel. In this respect, the struts running at an angle to the longitudinal direction of the panel can also be arranged at an angle to an edge, in particular a longitudinal edge, of the floor panel. Struts of this kind likewise make it possible to stiffen the panel-like portion against sagging and additionally contribute to absorbing shear loads in the plane of the floor panel.

The struts running at an angle to the longitudinal direction of the panel can also advantageously be combined with further struts which run in a crosspiece-like manner transversely and, in particular, perpendicularly to the edge, in particular the longitudinal edge, and preferably also transversely and, in particular, perpendicularly to a longitudinal direction of the panel, in order to achieve a particularly resistant floor panel.

In one configuration, the struts can comprise struts which are arranged in a manner crossing one another. In particular, the struts arranged at an angle to the longitudinal direction of the panel can contain struts of this type which cross one another. The oblique alignment of struts thus makes it possible for bending and shear loads to be uniformly absorbed.

In one refinement, the panel-like portion is not covered by the additional structure in certain regions on the second side of the panel-like portion between adjacent struts. In the region(s) which do not have a covering, the material of the panel-like portion can thus be exposed. Exposed regions of this type can contribute to a further saving in terms of weight.

In one configuration, the additional structure comprises short fibers which are embedded in the matrix material as the discontinuous reinforcing fibers. The short fibers can each have a length of, for example, a few millimeters.

In particular, in one refinement, the discontinuous reinforcing fibers, according to some typical examples of fibers of this type, can each have a length in a range between approximately 0.1 mm and approximately 50 mm Discontinuous fibers of other lengths, outside of this length range, can however likewise be envisaged in variants of the invention.

According to one configuration, provision is made that the additional structure covers the panel-like portion over its surface area on the second side of the panel-like portion in a region of the floor panel close to the edge or in regions of the floor panel close to the edge, in particular in a region of the floor panel which runs around the edge of the floor panel and is close to the edge. A region or regions of this type can, for example, be used to introduce fastening openings for the floor panel into this/these region(s). In this way, the panel-like portion is reinforced on the rear side by the additional structure where openings of this type are provided. In addition, provision can be made that the floor panel, in the region or regions close to the edge in which the covering over their surface area is provided by the additional structure, rests on the supporting components of a floor structure of the aircraft or spacecraft, for example on rails such as for instance seat rails. The contact regions of the floor panel are thus likewise provided with a reinforcement by the additional structure. In this respect, the additional structure not only offers mechanical protection and reinforcement, but can contribute to corrosion prevention when the floor panel rests on a metal component depending on the selection of the discontinuous reinforcing fibers in the region close to the edge or the regions close to the edge.

In one configuration, the additional structure extends on a peripheral surface of the floor panel in the direction of a thickness of the panel-like portion from the second side to the first side of the panel-like portion and, in the process, covers the panel-like portion in the region of the peripheral surface of the floor panel or at least a part of this peripheral surface. An effective, cost-saving protection of the peripheral surface and a cleaner peripheral termination are thus additionally possible. The edge of the floor panel is moreover additionally protected against mechanical loading, shock and damage.

In a preferred configuration, the additional structure is produced in an injection molding process and connected to the panel-like portion. In this respect, the additional structure is formed on, in particular, in what is known as an "overmolding" process. "Overmolding" of this type makes it possible to produce a relatively complex geometry of the additional structure in a time-saving and cost-saving manner.

In a further preferred configuration, the panel-like portion is produced as a laminate. In particular, the panel-like portion here can comprise a plurality of fiber layers, for example each with a different fiber orientation. By way of example, within the fiber layers the fiber orientation can be constant in each case.

The floor panel is designed, in particular, monolithically with a single, load-bearing top cover layer which is formed by the panel-like portion. With a "monolithic" design of this type with a single cover layer, the floor panel has high robustness against damage caused by shock or impact, to which the higher flexibility of the floor panel that can be achieved with this design also contributes.

In one configuration, the struts are provided with draft angles. In this way, the finished floor panel can be removed from the molding tool more easily.

In one configuration, a foot region of the struts has a rounded form in each case. In this way, it is possible to avoid or mitigate mechanical stress peaks arising under load in the foot region of the struts, in which foot region the struts each adjoin the panel-like portion. A reliable attachment of the struts is thus achieved.

In particular, the floor panel can be formed for use in a passenger area or in a cargo area of the aircraft or spacecraft.

In configurations, the thermoplastic material used in each case is preferably a high-performance thermoplastic. The thermoplastic material for forming the matrix material of the panel-like portion can be identical to or differ from the thermoplastic material for forming the matrix material of the additional structure.

In further configurations, the endless fibers of the panel-like portion are in the form of glass fibers or carbon fibers.

In a further configuration, the discontinuous reinforcing fibers of the additional structure are in the form of glass fibers or carbon fibers.

In one configuration, the endless fibers of the panel-like portion and the discontinuous reinforcing fibers of the additional structure are formed in each case with carbon fibers or in each case with glass fibers.

In a further configuration, provision can be made that the endless fibers of the panel-like portion are formed with carbon fibers, and that the additional structure comprises glass fibers in the form of discontinuous reinforcing fibers, at least in a part thereof, for example in the region close to the edge or in regions close to the edge in which the additional structure covers the panel-like portion over its surface area on the second side. With a combination of this type, an even more efficient floor panel can be provided which comprises a light, panel-like portion able to bear high loads, while the additional structure is equipped, for example in the region(s) close to the edge for contact with or resting on other elements, such as, for instance, seat rails, with embedded glass fibers which help to avoid corrosion when the floor panel is in contact with a metallic element. Carbon fiber-reinforced regions of the floor panel can thus be separated from the metallic element, for instance an aluminum seat rail, by glass fiber-reinforced regions of the floor panel.

In one configuration of the method, the panel-like piece is provided as a laminate, and the additional structure is formed on in the molding tool by means of an injection molding process. A process of this type can, in turn, be referred to as "overmolding". The advantages of a configuration of this type have been explained above. The panel-like piece forms the panel-like portion in the floor panel.

In one refinement, the provided panel-like piece can be produced by depositing unidirectional tapes which comprise the endless fibers in a layered arrangement.

The above configurations and refinements may be combined with one another as desired where expedient. Further possible configurations, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the invention.

It should be pointed out that the configurations and refinements of the invention set forth above with respect to the floor panel can be applied similarly to the aircraft or spacecraft and to the method according to the invention, and vice versa. In particular, in the floor panel, the panel-like piece provided in the method forms the panel-like portion of the floor panel.

BRIEF DESCRIPTION OF THE DRAWINGS

The invention will be explained in more detail below on the basis of the exemplary embodiments shown in the schematic figures, in which.

The appended figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another.

In the figures of the drawings, elements, features and components which are identical, functionally identical and of identical action are denoted in each case by the same reference signs unless stated otherwise.

DETAILED DESCRIPTION OF THE PREFERRED EMBODIMENTS

Figure 1:
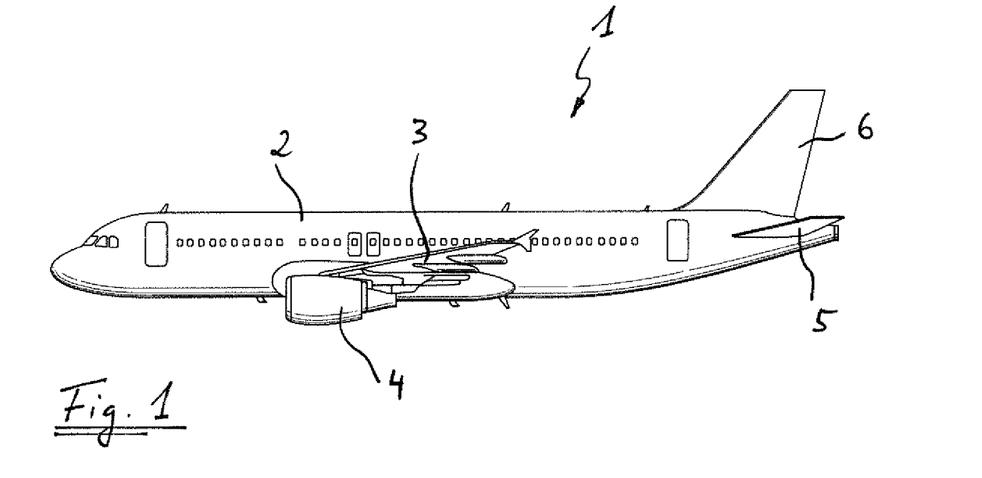
FIG. 1 shows an aircraft or spacecraft, for example an airplane, in which floor panels according to the exemplary embodiments explained below can find use.

FIG. 1 shows a passenger aircraft 1 which has a fuselage 2, wings 3, engines 4 and tail units 5 and 6.

Figure 2:
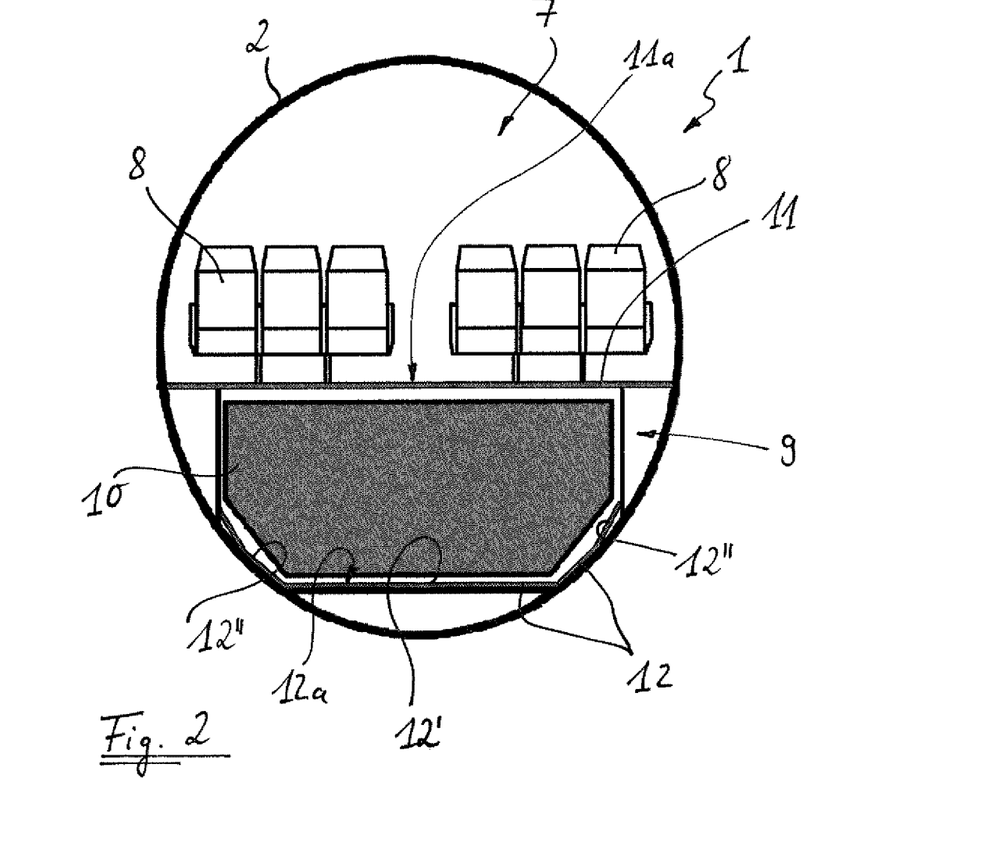
FIG. 2 shows a cross section through an exemplary aircraft fuselage for explaining different regions thereof in which floor panels according to the exemplary embodiments explained below can find use.

FIG. 2 schematically shows a cross-sectional view of the fuselage 2 of the aircraft 1. Provided in the part of the fuselage 2 that is at the top in FIG. 2 is a passenger area 7, which is equipped with a multiplicity of passenger seats 8 for the travelers.

Arranged in a region of the fuselage 2 that is at the bottom in FIG. 2 is a freight or cargo area 9, which in the example shown is configured to accommodate cargo or items of luggage which is/are stowed in containers 10.

FIG. 2 also shows a floor 11 of the passenger area 7, which is provided, in particular, for passengers and flight crew to use and walk on. FIG. 2 also shows a cargo hold floor 12, which is divided into a planar area 12' and inclined areas 12". The passenger compartment floor 11 and the cargo hold floor 12 are constructed with a planar arrangement of individual floor panels in each case, the latter not being illustrated in detail in FIG. 2, however.

The floor 11 of the passenger area 7 and the cargo hold floor 12 have different requirements with respect to the desired robustness of the floor panels. By way of example, in respect of the cargo area 9, different loading situations which can make a different robustness of the floor panels necessary are conceivable. In the case of expected loading with individual and optionally with heavy individual items of general cargo, for example, more robust floor panels can be provided than in the case of exclusive or extensive use of containers.

Figures 3, 14:
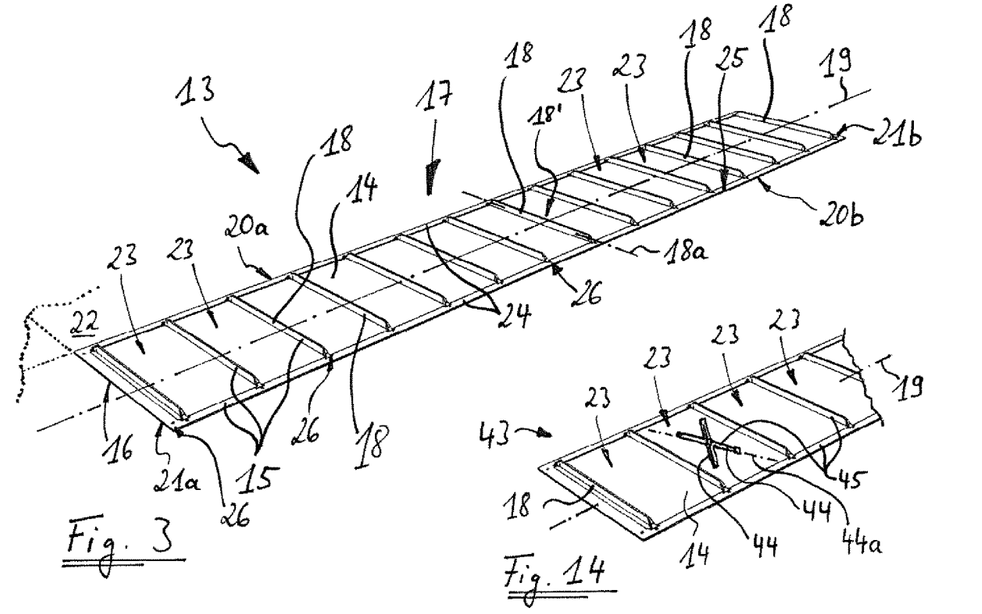
FIG. 3 shows a perspective rear view of a floor panel according to a first exemplary embodiment.
FIG. 14 shows a perspective rear view of a detail of a floor panel according to a further variant of the first exemplary embodiment.
Figure 4:
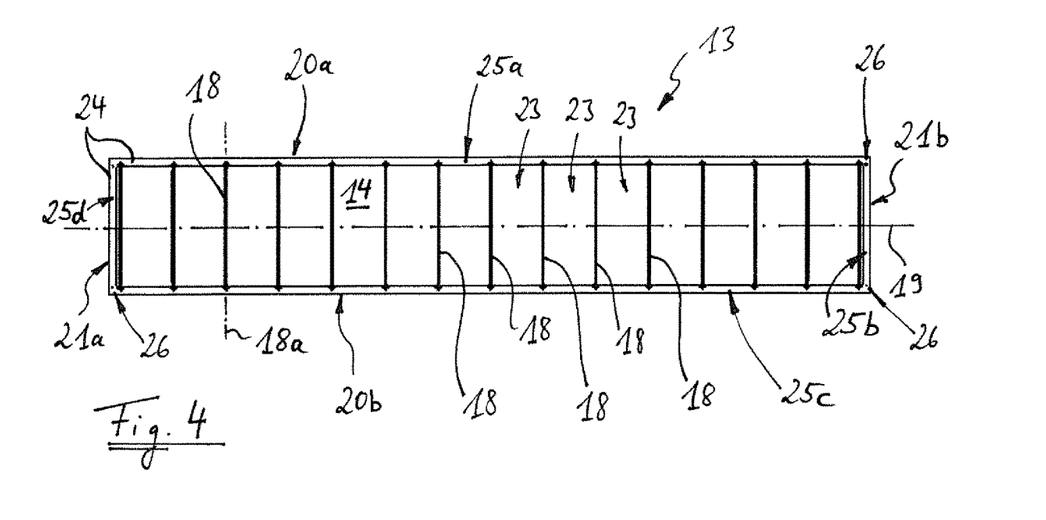
FIG. 4 shows a plan view from the rear of the floor panel from FIG. 3.

FIGS. 3 and 4 show a floor panel 13 for the aircraft 1 according to a first exemplary embodiment. The floor panel 13 has a panel-like portion 14 and an additional structure 15.

A first side 16, not visible in FIG. 3, of the panel-like portion 14 in the state of use of the floor panel 13 in which it is installed in the aircraft 1 serves to form part of a floor surface 11a of the passenger compartment floor 11 or a floor surface 12a of the cargo hold floor 12 and thus forms a used side, in the case of the floor 11 or of the planar area 12' a top side, of the floor panel 13. A second side 17 of the panel-like portion 14, which is opposite the first side 16, can also be seen in FIG. 3. In the state of use of the floor panel 13, the second side 17 is located on the rear side of the floor panel and is thus located on the bottom side of the floor panel 13, for example when the floor panel 13 is being used to form the floor surface 11a in FIG. 2.

The floor panel 13 is in the form of a "monolithic" fiber composite polymer element which has a thermoplastic matrix, the panel-like portion 14 forming the single load-bearing cover layer of the floor panel 13. In this respect, the panel-like portion 14 can, in particular, have a thicker form than cover layers of conventional sandwich panels.

The panel-like portion 14 and the additional structure 15 are each formed from a composite material, the portion 14 and the structure 15 each comprising a thermoplastic polymer material, in particular a high-performance thermoplastic, as matrix material. The matrix materials of the portion 14 and of the structure 15 can be the same or different, in both cases, however, a thermoplastic material being used as matrix both in the portion 14 and in the structure 15.

Embedded in the matrix material of the panel-like portion 14 are endless fibers in the form of reinforcing fibers, which can be carbon fibers or glass fibers or other suitable fibers. When the floor panel 13 is provided for the purpose of forming the floor 11 of the passenger area 7, carbon fibers are preferably used as endless fibers for reinforcing the panel-like portion 14. A floor panel 13 for forming the cargo hold floor 12, by contrast, can comprise glass fibers as the endless fibers in the panel-like portion 14.

Embedded in the matrix material of the additional structure 15 are discontinuous reinforcing fibers in the form of short fibers. The short fibers can, in turn, be carbon fibers or glass fibers or other suitable fibers. The length of the short fibers can amount to a few mm, for example, in each case. In particular, the short fibers can each have a length which lies in a range of approximately 0.1 mm to approximately 50 mm, for example. However, other short-fiber lengths or fiber length ranges therefor are conceivable.

During the production of the floor panel 13 in an injection molding process, the structure 15 is created by what is known as "overmolding" and connected to the panel-like portion 14. Provided for this purpose is a panel-like piece of material, which comprises the thermoplastic matrix material provided for the panel-like portion 14 as well as the endless fibers as reinforcing fibers and can be produced, for example, as a laminate by means of a previous layered deposition of fiber tapes, for instance unidirectional (UD) fiber tapes. The panel-like piece provided thus comprises a plurality of fiber layers having, e.g., a different fiber orientation and transitions into the panel-like portion 14 during manufacture of the floor panel 13.

The panel-like piece is delivered into a molding tool 100, which is illustrated by way of example in FIG. 12 and will be described in more detail later. In the molding tool 100, the additional structure 15 is formed onto the panel-like piece. During this forming-on operation, the primary forming of the additional structure 15 and a permanent connection thereof to the panel-like piece and thus to the portion 14 take place, with the result that the additional structure 15 and the panel-like portion 14 form one piece in the finished floor panel 13.

FIG. 3 also shows that the additional structure 15 is arranged substantially on the rear side of the panel-like portion 14 and is connected fixedly and permanently to the portion 14 at least on the second side 17, mostly on the second side 17 in FIG. 3. The connection is effected during the forming-on operation in the "overmolding" process described.

The additional structure 15 contains a supporting structure for the floor panel 13 which delimits the deformation thereof and, in particular, sagging during use and stiffens the panel-like portion 14. For this purpose, the additional structure 15 comprises a plurality of rib-like or beam-like struts 18, each of which is arranged substantially parallel to a main plane of extent 22 of the panel-like portion 14 and connected to the panel-like portion 14.

The periphery of the floor panel 13 in FIGS. 3 and 4 is in the form of an elongate rectangle in the plan view. A longitudinal direction of the floor panel 13 is denoted by reference sign 19 in FIGS. 3 and 4 and corresponds to a longitudinal center axis of the floor panel 13 in this example. The floor panel 13 comprises, see FIG. 4, two opposite longitudinal edges 20a, 20b and two opposite transverse edges 21a, 21b.

The struts 18 of the floor panel 13 are arranged on the second side 17 in a manner spaced apart uniformly along the panel longitudinal direction 19, all of the struts 18 running parallel to one another and parallel to the transverse edges 21a, 21b. Each of the struts 18 is thus aligned with a longitudinal direction 18a of the strut substantially perpendicularly with respect to each of the longitudinal edges 20a, 20b and substantially perpendicularly with respect to the panel longitudinal direction 19.

Each of the struts 18 of the floor panel 13 thus runs from the longitudinal edge 20a to the longitudinal edge 20b in the manner of a crosspiece. In this respect, the struts 18, the number of which amounts to fifteen by way of example in the case of the floor panel 13, divide the floor panel 13 on the rear side into a plurality of areas 23, in the example shown the panel-like portion 14 being substantially exposed on the second side 17 between adjacent struts 18 and thus not being covered there by the additional structure 15.

In addition to the struts 18, the additional structure 15 has a substantially planar portion 24 which runs around the rear side of the floor panel 13 along the circumferential outer edge of the floor panel. Here, the circumferential outer edge of the floor panel 13 is formed by the individual edges 20a, 20b, 21a and 21b. The circumferential portion 24 is formed at the same time as the struts 18 during the forming-on operation in the injection molding process, is connected to the struts 18 in each case at both ends thereof in the exemplary embodiment shown, and has a more planar design in a thickness direction of the floor panel 13 than the struts 18.

The portion 24 of the structure 15 covers the panel-like portion 14 on the second side 17 in regions 25a to 25d, of the floor panel 13 that are close to the edge, the regions 25a-d together forming a closed circumferential region 25 of the floor panel 13 that is close to the edge. Within the region 25 that is close to the edge, the floor panel 13 has a number of through-openings 26 which are provided for fastening the floor panel 13 to elements of a floor structure of the aircraft 1, in particular to rails, such as for instance seat rails. In this respect, the floor panel 13 can rest on rails of this type by way of the portion 24 or parts thereof.

The through-openings 26, which either can be introduced after conclusion of the injection molding, for example as bores or by milling, or can be introduced during the injection molding operation using hot mandrels or similar devices, are indicated in FIGS. 3 and 4, by way of example, in the corner regions of the floor panel 13 and also close to the ends of the struts 18 in each case, it being possible for openings 26 to alternatively or additionally be provided at other locations of the region 25.

The floor panel 13 can be produced in the "overmolding" process very efficiently, it being possible to overmold the panel-like piece with the additional structure 15 with a small time requirement of a few minutes, for example. In addition, the floor panel 13, which has a monolithic form in the manner described, has good resistance to shock and impact loading, to which the single "monolithic" cover layer which is formed by the panel-like portion 14 contributes. The floor panel 13 also has an advantageous flexibility which helps to avoid damage when it is impacted by objects during use of the floor panel 13.

FIG. 14 shows an illustration of a detail of a floor panel 43 according to a variant of the first exemplary embodiment in a manner analogous to FIG. 3. The floor panel 43 differs from the floor panel 13 of the first exemplary embodiment only in that additional struts 44, which run in a manner respectively at an angle to the panel longitudinal direction 19 and crossing one another, are provided in the interior of one or more of the areas 23. In FIG. 14, in the case of the floor panel 43, the struts 44 are formed on only in an inner region of the area 23 on the second side 17 of the panel-like portion 14, the struts 44 likewise having a rib-like or beam-like form and adjoining the panel-like portion 14 in their foot region approximately analogously to the struts 18. In the same way as the struts 18, the struts 44 are a constituent part of the additional structure 45, which corresponds to the additional structure 15 in FIGS. 3 and 4 except for the struts 44. The struts 44 are preferably formed with the same material as the struts 18, thus with a thermoplastic matrix comprising reinforcing short fibers.

The struts 44 provided in a manner crossing one another in FIG. 14 form a grid, which can be referred to as a type of "micro-grid" and serves to additionally stiffen the panel-like portion 14 in the interior of the area 23. The struts 44 can be provided in all of the areas 23 or only in one or some of the areas.

Figure 5:
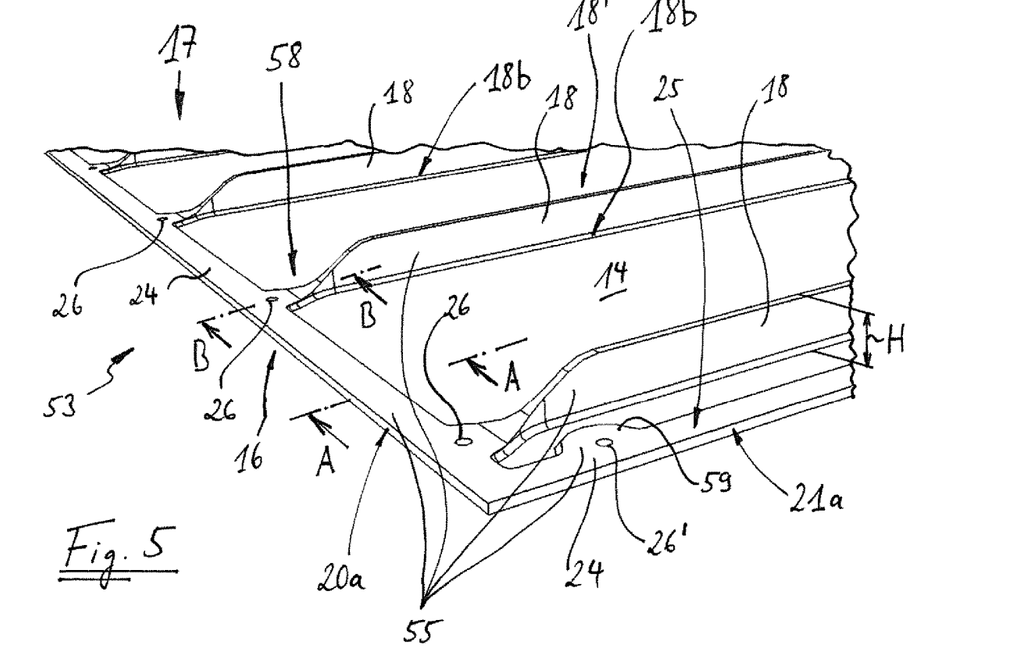
FIG. 5 shows an enlarged detail of a floor panel, as seen perspectively from a rear side thereof, according to a variant of the first exemplary embodiment.

A further variant of the first exemplary embodiment is shown in FIG. 5. FIG. 5 shows a sub-region of a floor panel 53 which corresponds to the floor panel 13 of the first exemplary embodiment with the exception of differences and special features described below.

Crosspiece-like struts 18 are also provided in the case of the floor panel 53, in a manner analogous to FIGS. 3 and 4. FIG. 5 shows that the struts 18, like in the above-described variants of the first exemplary embodiment in FIGS. 3, 4 and 14, are connected in one piece by the injection molding process during the production to the portion 24, which covers the panel-like portion 14 on the rear side in the circumferential region 25 of the floor panel 53 that is close to the edge, and specifically in connecting regions 58. In the connecting regions 58—in the case of the floor panel 53, but also in the case of the floor panels 13, 43 of the variants explained above—the geometry of the struts 18 gradually lowers in each case from the greatest height of the strut 18 with respect to the panel-like portion 14 to the significantly smaller height of the portion 24 in the region 25 close to the edge. As the height of the strut 18 decreases, the strut widens to the thickness of the portion 24 in a direction parallel to the panel-like portion 14. A width of the strut 18 thus adjoins the portion 24 and is significantly greater than the width or wall thickness of the strut 18 in the central or main region 18' thereof.

FIG. 5 also shows that the connection of the struts 18 in the foot region 18b thereof has a rounded design, in order to achieve a connection of the strut 18 to the panel-like portion 14 which is as effective as possible.

Also in FIG. 5, the floor panel 53 has fastening openings 26 which are introduced along the longitudinal edge 20a and preferably approximately symmetrically along the opposite longitudinal edge 20b (not shown in FIG. 5), in the portion 24 and also that region of the panel-like portion 14 lying therebelow. By way of example, this can be effected in the molding tool 100 using hot mandrels or similar devices, or the fastening openings 26 can be introduced subsequently, that is to say, after removal from the molding tool 100, as bores.

FIG. 5 also shows a further opening 26' in the region of the transverse edge 21a of the floor panel 53. The opening 26' can serve as a further fastening opening and is likewise introduced in the floor panel 53 in the region 25 of the floor panel that is close to the edge, that portion 24 of the additional structure 55 that covers the region 25 which is close to the edge widens in the vicinity of the opening 26' in a tab-like manner towards the inside of the floor panel 53, for example approximately in the form of a sector of a circle or in the form of a semicircle or the like.

Similar widenings of the region 24, denoted with the reference sign 59 in FIG. 5, can also be provided at further points along the edge 20a, 20b, 21a, 21b in such a way that they respectively locally widen the portion 24. It is not necessary to provide an opening 26' in the region of each of these widenings 59 as standard practice, but it is conceivable that, in the case of a type of "standard floor panel" with widenings 59 of this type, options are provided in an expedient manner to subsequently additionally be able to introduce possibly required additional openings in the form, for example, of bores or by milling Additional optional openings of this type can be expedient, for example, for locally adapting floor panels in the aircraft 1, for instance for the purpose of additional fastening of the floor panel or when the intention is to fasten further components, such as monuments, air crew seats, electrical equipment or further equipment for the interior of the cabin, or to connect them to the floor panel. In this way, the situation can be avoided in which the molding tool used to produce the floor panel has to be changed or modified, if, for example, fastening or attachment openings are to be added for some floor panels to be produced. Beyond the above, the additional structure 55 corresponds to the structure 15.

Figure 10:
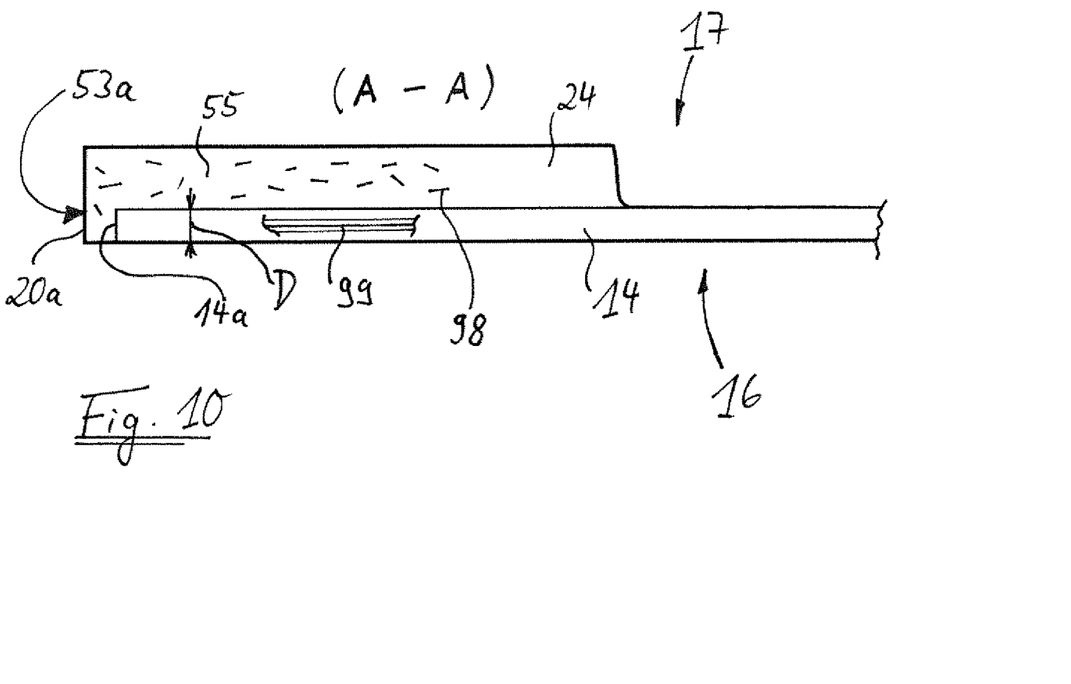
FIG. 10 shows an enlarged, regional and schematic cross section A-A through the floor panel according to the variant from FIG. 5.
Figure 11:
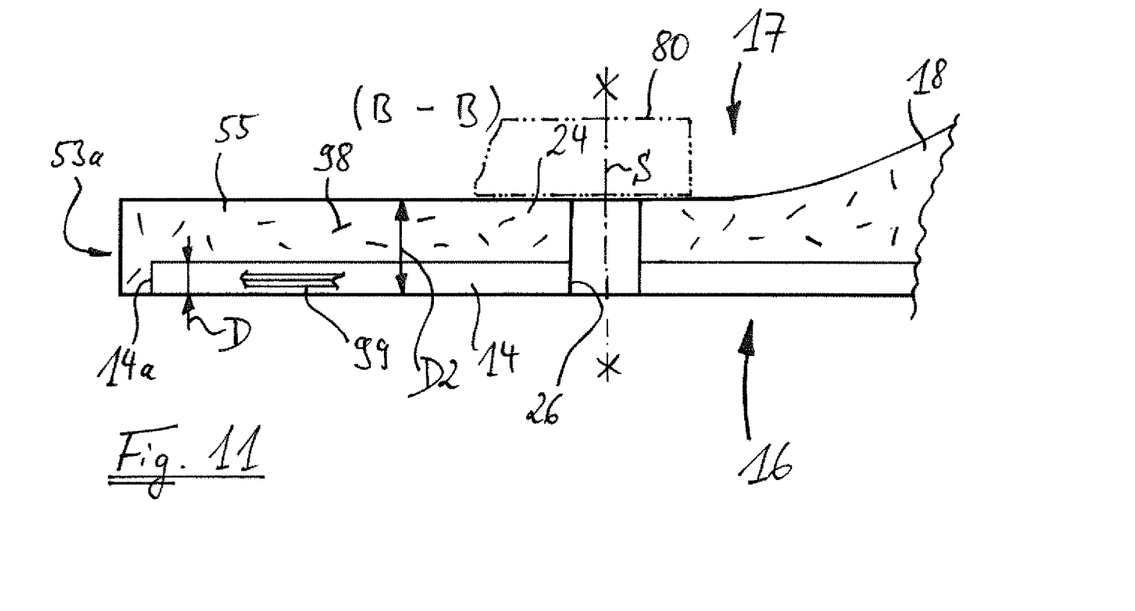
FIG. 11 shows an enlarged, regional and schematic cross section B-B through the floor panel according to the variant from FIG. 5.

FIG. 10 schematically shows a sectional illustration A-A in the edge region of the floor panel 53 according to the variant of the first exemplary embodiment in FIG. 5 in a region between two struts 18, while FIG. 11 schematically shows a section B-B of the variant of FIG. 5 along the center line of one of the struts 18.

In FIGS. 5, 10 and 11, the additional structure 55 extends from the portion 24 thereof in the direction of a thickness D of the panel-like portion 14 from the second side 17 to the first side 16 of the panel-like portion 14 around an external edge 14a of the panel-like portion 14. The external edge 14a of the panel-like portion 14 is thus bordered by the additional structure 55, in the example of FIGS. 5, 10 and 11 along the entire circumference of the panel-like portion 14. In FIG. 5, the additional structure 55 thus covers the panel-like portion 14 in the region of the entire peripheral surface 53a of the floor panel 53. FIGS. 10 and 11 show this by way of example for the longitudinal edge 20a. It would instead be conceivable, for example, to border only parts of the edge 14a, for instance in the region of each of the longitudinal edges 20a-b or each of the transverse edges 21a-b in this way. In this way, additional protection and termination of the edge 14a can be achieved.

FIGS. 10 and 11 schematically also show the short fibers 98 for reinforcing the additional structure 55 and also the endless fibers 99 for reinforcing the panel-like portion 14. FIG. 11 also shows a portion of the strut 18 which runs in a rounded manner into the portion 24, and also a through-opening 26. Furthermore, FIG. 11 schematically outlines a sub-region of a rail 80, e.g., a seat rail, it being understood that that side 16 of the floor panel 53 which is at the bottom in FIG. 11 concomitantly forms the top side of the floor 11 or 12 in the installed and use state of the floor panel. A screw S for fixing the floor panel 53 and the rail 80 to one another is also schematically illustrated, it being possible to insert a suitable insert (not shown) into the opening 26 that, however, can be relatively small and cost-saving on account of the relatively small thickness D2 in the edge region of the floor panel 53. In FIGS. 10 and 11, by way of example, D2 can be approximately twice to three times the magnitude of D.

Figure 6:
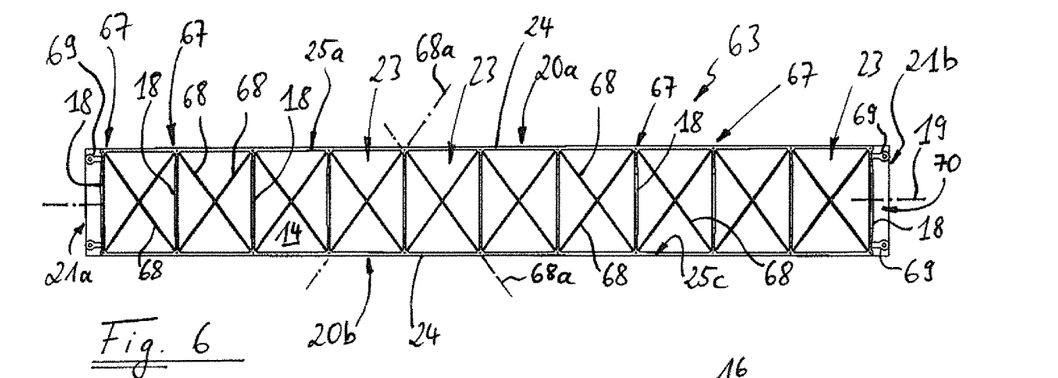
FIG. 6 shows a plan view from the rear side of a floor panel according to a second exemplary embodiment.
Figure 7:
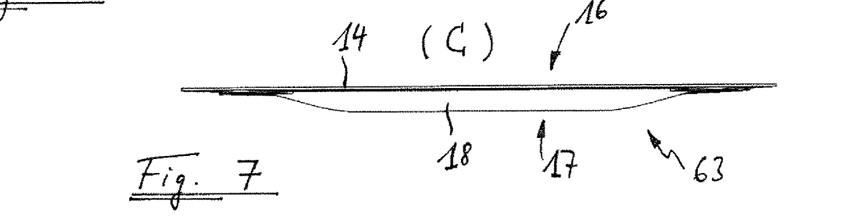
FIG. 7 shows a side view C of the floor panel from FIG. 6, as seen from the narrow side thereof; see also FIG. 8.
Figure 8:
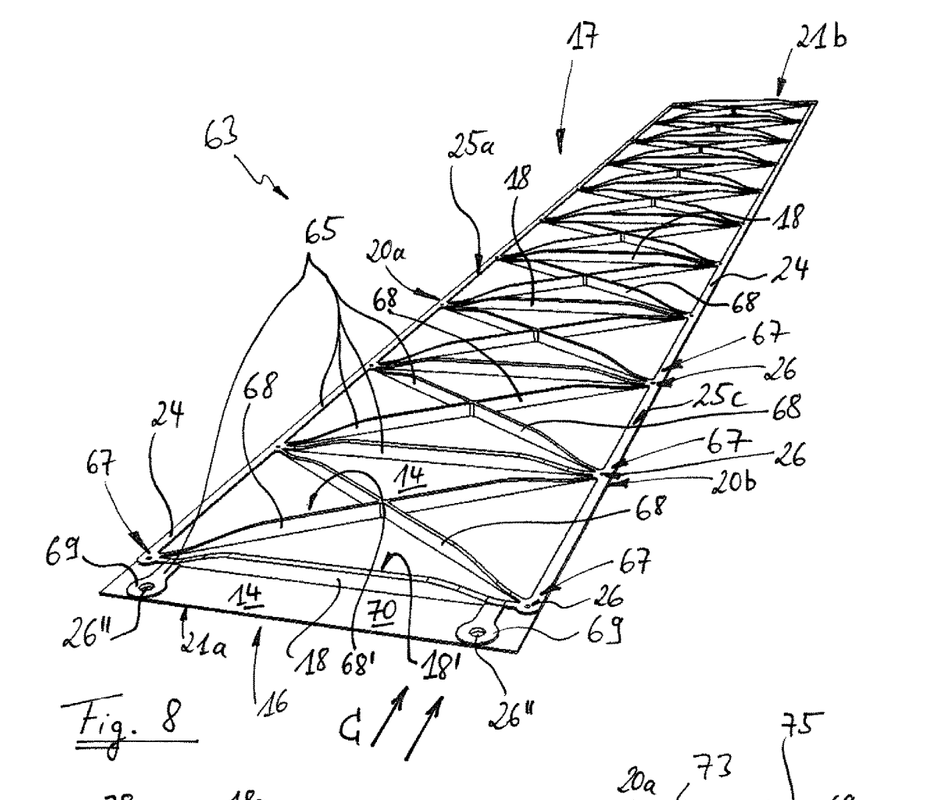
FIG. 8 shows a perspective rear view of the floor panel from FIG. 6.

FIG. 6 shows a floor panel 63 according to a second exemplary embodiment, in turn as seen in a plan view from the rear side. The floor panel 63 is illustrated in FIGS. 7 and 8 in a side view and a perspective view, the first side 16 lying at the top in FIG. 7. The panel 63 differs from the floor panel 13 according to the first exemplary embodiment in the points described below, reference being made to the explanations relating to the first exemplary embodiment beyond this.

Also in the case of the floor panel 63, crosspiece-like struts 18 are provided in regular sections along the longitudinal direction 19 of the panel, the struts 18 being constituent parts of an additional structure 65 analogous to the additional structure 15. For the purpose of further stiffening the panel-like portion 14, in the case of the floor panel 63 the additional structure 65 however comprises yet further struts 68, which cross one another and follow, in particular, substantially rectangular areas 23 which are delimited by respectively adjacent struts 18. In the example of FIG. 6, the struts 68 are provided in each of the areas 23, only some of which are provided with reference signs in FIG. 6.

The struts 18 and 68 are connected, in each case in connection regions 67, to portions 24 of the additional structure 65, which, in FIGS. 6 to 8, cover the panel-like portion 14 on the second side 17 over its surface area in regions 25a, 25c, which are close to the edge, along the longitudinal edges 20a, 20b of the floor panel 63. In the region of the corner of the floor panel 63, an end in each case of a strut 18 and a strut 68 run into the portion 24, while respectively two struts 68 and a strut 18 run into the portion 24 in the further connection regions 67.

In the example of FIG. 6, the struts 68 are thus respectively arranged with the longitudinal direction 68a thereof at an angle to the longitudinal direction 19 of the panel and thus further at an angle to the edges 20a-b, 21a-b of the floor panel 63.

The panel-like portion 14 within triangular regions visible in FIG. 6 is substantially exposed between the struts 18 and the struts 68, each of which are permanently connected by injection molding to the panel-like portion 14 during "overmolding".

FIG. 8 also shows that both the struts 18 and the struts 68 are recessed towards the connection regions 67, i.e., the height of the struts 18 and 68 becomes smaller from the respective center or main regions 18', 68' thereof towards the portions 24 of the additional structure 65.

FIG. 8 shows that the planar portions 24 of the additional structure 65 cover the panel-like portion 14 over its surface area not in a region 25 which is close to the edge and encircles the entire edge of the floor panel 63, as is the case in FIG. 5, but instead only in the longitudinal-side regions 25a and 25c, close to the edge, of the floor panel 63 along the edges 20a-b. The panel-like portion 14 is exposed in a region 70 between the transverse edge 21a or 21b and the first strut 18, which is respectively adjacent to the edge 21a, 21b, in each case adjacent to the edges 21a and 21b.

FIG. 8 also shows that, proceeding from the respectively first strut 18 adjacent to the transverse edge 21a or 21b respectively, a planar, tab-like portion 69, which forms a part of the additional structure 65 and is connected to the portion 14 by injection molding for example with the same material as the struts 18, 68 and the portions 24, runs on the rear side of the portion 14 towards the edge 21a or (not visible in FIG. 8) 21b. Each of the substantially planar portions 69 is widened in the manner of an eye at the ends thereof that are distal from the adjacent strut 18 and encloses an opening 26", which serves for example for fastening or attachment purposes.

Also in the case of the floor panel 63, it is possible for the portions 24 and 69, each of which form parts of the additional structure 65, to serve as contact regions on which the floor panel 63 rests on adjacent and, for example, supporting or bearing elements, such as rails for instance.

Figure 9:
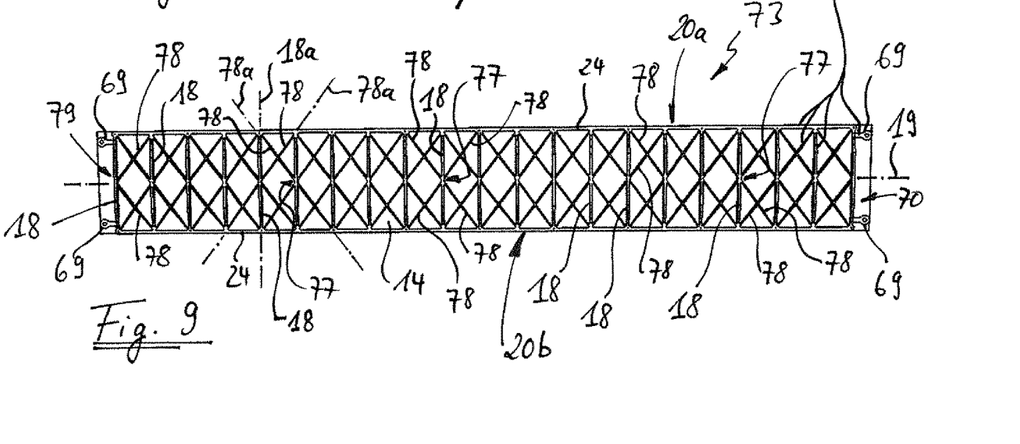
FIG. 9 shows a plan view from the rear side of a floor panel according to a third exemplary embodiment.

In a bottom view from the rear, FIG. 9 shows a floor panel 73 according to a third exemplary embodiment. While in the second exemplary embodiment the struts 18, 68 form a comparatively rough "grid" at the rear side for stiffening the floor panel 63, the floor panel 73 has an even more robust form. The floor panel 73 has a greater number of crosspiece-like struts 18 in comparison with the second exemplary embodiment and also struts 78, which respectively run with the strut longitudinal direction 78a at an angle to the longitudinal direction 19 of the panel, cross one another and are permanently connected to the panel-like portion 14 in the form of a fine grid and moreover in two rows in a manner crossing one another in the region of the second side 17. Beyond this, the floor panel 73 corresponds to the floor panel 63 of the second exemplary embodiment, with the result that reference can be made to the above embodiments.

In the case of the floor panel 73, the struts 18 and 78 thus form a comparatively fine, stiffened grid, as a result of which the floor panel 73 is even more robust than the floor panel 63. Formed along the longitudinal direction 19 of the panel and in a manner resting thereon, in the case of the floor panel 73 at the rear side, in addition to the connection regions 67 at the edge analogously to the second exemplary embodiment, are joining regions 79 and 77 in which two or four oblique struts 78 and one crosspiece-like, transversely running strut 18 run together. Together with the portions 24 and the portions 69, in a manner analogous to FIG. 8, the struts 18, 78 form constituent parts of the additional structure 75 of the floor panel 73.

For each of the floor panels 13, 43, 53, 63, 73 according to the exemplary embodiments described above and the variants thereof, the additional structure 15, 45, 55, 65, 75 is "molded on" by injection molding ("overmolding") on the rear side 17 of the panel-like portion 14. While the panel-like portion 14 is reinforced with endless fibers, which can comprise carbon or glass fibers, the additional structure 15, 45, 55, 65, 75 is reinforced with short fibers in each case, for which carbon fibers or glass fibers can likewise be used. By way of example, for the passenger area 7, it is possible to provide floor panels in which a carbon-fiber reinforcement in the panel-like portion 14 is combined with a reinforcement by means of carbon short fibers in the additional structure 15, 45, 55, 65 or 75. By contrast, for the cargo area 9 it is possible to combine endless glass fibers in the panel-like portion 14 with glass fibers in the form of short fibers in the additional structure 15, 45, 55, 65 or 75. However, in variants, it can be useful to reinforce the additional structure 15, 45, 55, 65 or 75, or at least the portion(s) 24 and, for example, the portions 69, which can serve as a support on further elements, with glass fibers in the form of short fibers, and at the same time to provide an endless fiber reinforcement with carbon fibers in the panel-like portion 14. In this way, a particularly resistant panel-like portion 14 is combined with an additional structure, which allows the latter to readily prevent corrosion in contact with further and in particular metallic elements. In this way, a particularly efficient floor panel can be provided.

All of the struts 18, 44, 68, 78 described above can be provided in their foot regions, for example 18b, in which they are permanently connected to the panel-like portion 14, with a rounding in cross section and thus adjoin the panel-like portion 14 in a rounded manner.

Figure 12:
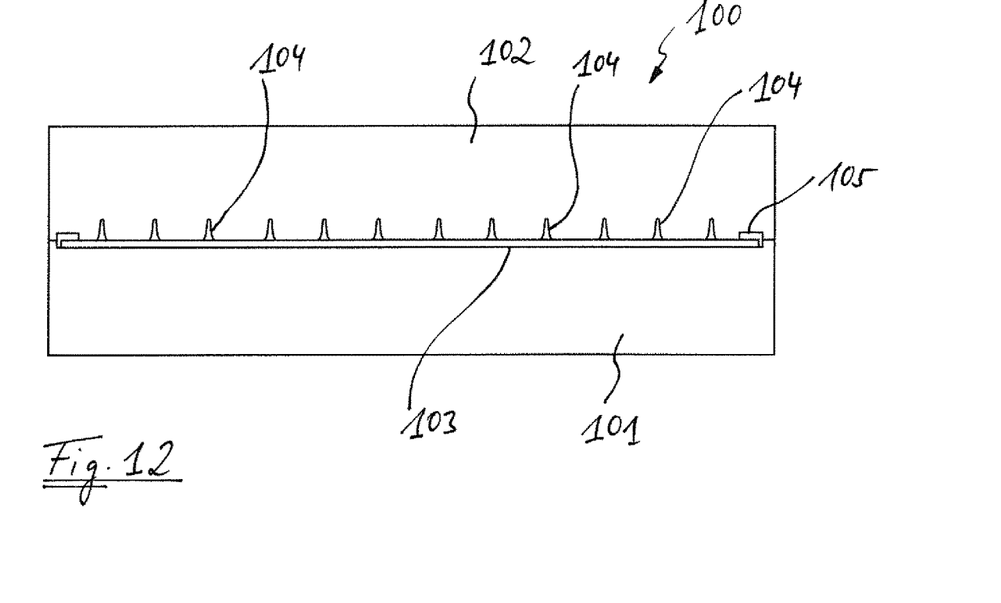
FIG. 12 shows an exemplary molding tool for creating a floor panel according to the first exemplary embodiment.

The molding tool 100, as is used by way of example for the production of the floor panel 13 according to the first exemplary embodiment by means of "overmolding", is illustrated schematically in section in FIG. 12. Analogous molding tools, which are geometrically correspondingly adapted, serve for the production of the floor panels 43, 53, 63, 73.

In the use state, a top and a bottom tool part 102, 101 together form a closed tool 100, which on the bottom tool part 101 comprises a substantially flat base surface 103 of a planar hollow space and also further additional cavities 104 and 105. A panel-like piece of material, which is intended to form the panel-like portion 14 in the finished floor panel, can be inserted on the flat base surface 103 during the production of floor panels. In this respect, for example, the panel-like piece of material is a laminate, produced in advance using unidirectional fiber tapes, which comprises the thermoplastic matrix and the reinforcing endless fibers embedded therein. By way of example, this panel-like piece of material, which forms a kind of base laminate for the manufacturing operation, can be heated to a suitable temperature, which enables a good connection to the additional structure, for the "molding on" of the additional structure 15, 45, 55, 65 or 75.

By way of example, in FIG. 12, after the tool 100 has been closed, it is possible to produce struts 18 using the cavities 104 and a circumferential, reinforcing and protective region 24 of the additional structure in the peripheral region of the future floor panel using the cavities 105. For this purpose, the thermoplastic matrix material with the short fibers incorporated therein for the additional structure, e.g., 15, is fed to the cavities 104 and 105 through channels, which are not illustrated in detail in FIG. 12. During the "overmolding" operation, an at least partial penetration of short fibers into the surface of the heated panel-like piece is possible.

In all of the exemplary embodiments explained above, also see the outlines of the cavities 104 in FIG. 12, the struts 18, 44, 68, 78 and, if required, also further parts of the additional structure 15, 45, 55, 65, 75 are provided with draft angles of a few degrees which facilitate the removal of the floor panel from the molding tool 100.

All of the floor panels 13, 43, 53, 63 and 73 according to the exemplary embodiments described above can advantageously be used by way of example for forming a passenger compartment floor 11 or a cargo hold floor 12 in the aircraft 1 of FIG. 1. For this purpose, a planar arrangement of the floor panels 13, 43, 53, 63 or 73 is formed. Optionally, different types of floor panels of this type could be combined to form the floor area, for example if different requirements on the robustness of the floor and the ability of the floor to bear high mechanical loads in a variety of regions thereof were to appear expedient.

Figure 13:
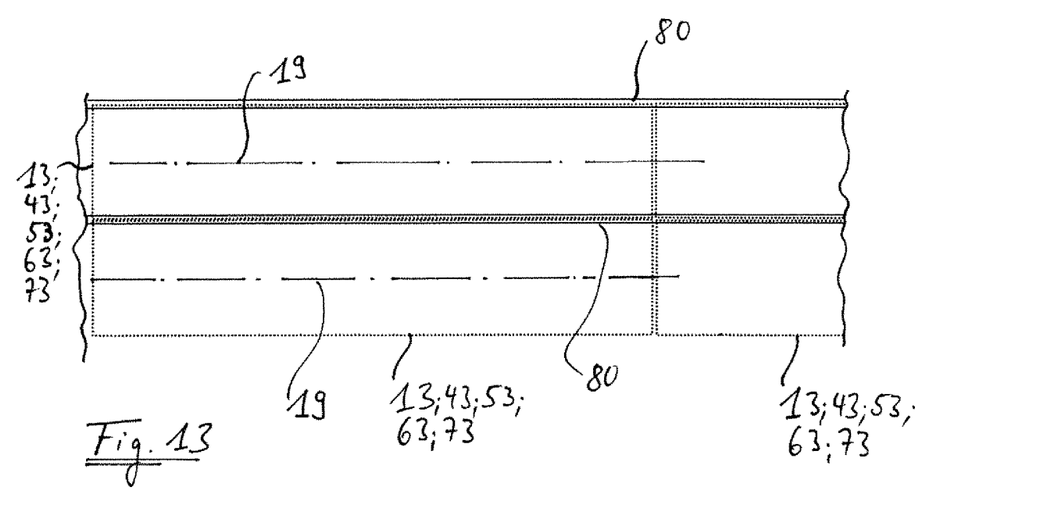
FIG. 13 shows a plan view of a planar arrangement of floor panels according to one of the first to third exemplary embodiments or the variants thereof.

A plan view in FIG. 13 schematically illustrates a planar arrangement of floor panels on the basis of the example of a plurality of floor panels 13 according to the first exemplary embodiment, in addition to rails 80 as supports for the floor panels 13.

Each of the floor panels 13, 43, 53, 63, 73 can, for example, have a size in the plan view of approximately one square meter.

A width of the floor panel 13, 43, 53, 63, 73 along the transverse edge 21a-b can, purely by way of example, lie in a range of approximately 40 cm to approximately 70 cm. A length of the floor panel 13, 43, 53, 63, 73 along the longitudinal edge 20a-b can, purely by way of example, lie in a range of approximately 150 cm to approximately 280 cm.

By way of example, the floor panel 13 of FIGS. 3 and 4 can have a length along the longitudinal edge 20a-b of between 250 cm and 260 cm, and a width along the transverse edge 21a-b of between 40 cm and 50 cm in the case of a height H of the struts 18 of, for example, between 15 mm and 25 mm, for example approximately H=20 mm (see FIG. 5), and also, in particular, a wall thickness of the struts 18 of, for example, between 3 mm and 4 mm. In this respect, in particular, the thickness D of the panel-like portion 14 can lie in a range of between approximately 1 mm and approximately 2.5 mm. In particular, the thickness D2 (FIG. 11) can also lie in a range of between approximately 3 mm and approximately 4 mm Floor panels 13, 43, 53, 63, 73 of other dimensions and formats can, however, likewise be envisaged.

The floor panels 13, 43, 53, 63, 73, according to the exemplary embodiments described above can be produced in a highly automated manner, as a result of which the time requirement for producing them can be considerably reduced, as can the costs this incurs. The cost-saving manufacture according to the invention can be effected even more advantageously when a multiplicity of identically configured floor panels are produced. At the same time, floor panels with a higher robustness and higher service life can be provided.

Although the present invention has been described above entirely on the basis of preferred exemplary embodiments, the invention is not restricted to this but may rather be modified in a variety of ways.

By way of example, the arrangement, number and/or cross-sectional form of the struts for stiffening the panel-like portion can be modified in order to meet different requirements on the robustness and service life of the floor panel. It is also conceivable to manufacture floor panels with an outer contour that is not rectangular in the manner according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Aircraft
2 Fuselage
3 Wings
4 Engines
5 Tail unit
6 Tail unit
7 Passenger area
8 Passenger seat
9 Cargo hold
10 Container
11 Floor (passenger area)
11a Floor surface
12 Cargo hold floor (cargo area)
12' Planar area
12" Inclined region
12a Floor surface
13 Floor panel
14 Panel-like portion
14a Edge (panel-like portion)
15 Additional structure
16 First side (panel-like portion)
17 Second side (panel-like portion)
18 Strut
18' Main region (strut)

18a Longitudinal direction of the strut
18b Foot region (strut)
19 Longitudinal direction of the panel
20a,b Longitudinal edge
21a,b Transverse edge
22 Main plane of extent (panel-like portion)
23 Area (floor panel)
24 Portion (additional structure)
25 Circumferential region close to the edge (floor panel)
25a-d Region close to the edge (floor panel)
26 Opening
26' Opening
26" Opening
43 Floor panel
44 Strut
44a Longitudinal direction of the strut
45 Additional structure
53 Floor panel
55 Additional structure
58 Connection region
59 Widening
63 Floor panel
65 Additional structure
67 Connection region
68 Strut
68' Main region (strut)
68a Longitudinal direction of the strut
69 Portion (additional structure)
70 Region
73 Floor panel
75 Additional structure
77 Joining region
78 Strut
78a Longitudinal direction of the strut
79 Joining region
80 Seat rail
98 Short fiber
99 Endless fiber
100 Molding tool
101 Lower tool half
102 Upper tool half
103 Base surface
104 Cavity
105 Cavity
D Thickness (panel-like portion)
D2 Thickness (floor panel, in the region close to the edge)
H Height (strut)
S Screw

The invention claimed is:

1. A floor panel for an aircraft or spacecraft, comprising a panel-like portion; and
an additional structure;
wherein a first side of the panel-like portion is provided to form part of a floor surface in the aircraft or spacecraft;
wherein the additional structure is connected to the panel-like portion at least on a second side of the panel-like portion that is opposite the first side;
wherein the panel-like portion and the additional structure each comprise a matrix material formed by a thermoplastic material;
wherein endless fibers as reinforcing fibers are embedded in the matrix material of the panel-like portion;
wherein discontinuous reinforcing fibers are embedded in the matrix material of the additional structure;
wherein the additional structure comprises a plurality of struts in which the discontinuous reinforcing fibers are embedded to stiffen the panel-like portion, and
wherein a first group of struts of the plurality of struts is aligned with a longitudinal direction of said first group of struts substantially perpendicular to a longitudinal edge of the floor panel.

2. The floor panel according to claim 1, wherein the additional structure is arranged substantially or at least mostly on a rear side of the panel-like portion.

3. The floor panel according to claim 1, wherein the plurality of struts comprises a plurality of rib-like or beam-like struts, each of which is connected to the panel-like portion with a longitudinal direction of said strut arranged substantially parallel to a main plane of extent of the panel-like portion.

4. The floor panel according to claim 1, wherein a second group of struts of the plurality of struts is arranged with a longitudinal direction of said second group of struts at an angle to a longitudinal direction of the floor panel.

5. The floor panel according to claim 1, wherein at least some of the plurality of struts are arranged in a manner crossing one another.

6. The floor panel according to claim 1, wherein the panel-like portion is not covered by the additional structure in certain regions on the second side of said panel-like portion between adjacent struts of the plurality of struts.

7. The floor panel according to claim 1, wherein the additional structure comprises short fibers which are embedded in the matrix material as the discontinuous reinforcing fibers.

8. The floor panel according to claim 1, wherein the additional structure covers the panel-like portion over its surface area on the second side of said panel-like portion in a region of the floor panel which runs around an edge of said floor panel and is close to the edge.

9. The floor panel according to claim 1, wherein the additional structure extends on a peripheral surface of the floor panel in a direction of a thickness of the panel-like portion from the second side to the first side of the panel-like portion and covers at least a part of the panel-like portion in a region of the peripheral surface of the floor panel.

10. The floor panel according to claim 1, wherein the additional structure is produced in an injection molding process and connected to the panel-like portion.

11. An aircraft or spacecraft having a floor area which is formed by a planar arrangement of floor panels according to claim 1.

12. A method for producing a floor panel for an aircraft or spacecraft, having the following steps:
providing a panel-like piece which comprises a matrix material formed by a thermoplastic material and endless fibers as reinforcing fibers, wherein a first side of the panel-like piece is provided for forming part of a floor surface in the aircraft or spacecraft;
delivering the panel-like piece into a molding tool;
forming an additional structure onto the panel-like piece in the molding tool, wherein the additional structure is formed with a matrix material formed by a thermoplastic material and discontinuous reinforcing fibers are embedded into the matrix material of the additional structure,
wherein the additional structure is permanently connected to the panel-like piece on a second side of the panel-like piece that is opposite the first side during the forming-on operation,
wherein the additional structure comprises a plurality of struts in which the discontinuous reinforcing fibers are embedded to stiffen the panel-like portion, and wherein a first group of struts of the plurality of struts is aligned with a longitudinal direction of said first group of struts substantially perpendicular to a longitudinal edge of the floor panel.

13. The method according to claim 12, wherein the panel-like piece is provided as a laminate and the additional structure is formed in the molding tool by means of an injection molding process.

* * * * *